United States Patent [19]
Anderson

[11] Patent Number: 5,240,211
[45] Date of Patent: Aug. 31, 1993

[54] BOW SUPPORT APPARATUS

[76] Inventor: Ryan L. Anderson, 32 Walton St., York Haven, Pa. 17370

[21] Appl. No.: 889,843

[22] Filed: May 28, 1992

[51] Int. Cl.⁵ .............................................. A47G 29/00
[52] U.S. Cl. .................................. 248/125; 124/24.1; 124/88
[58] Field of Search ............... 248/121, 122, 125, 149, 248/161, 688; 124/24.1, 23.1, 86, 88; 211/205, 208

[56] References Cited

U.S. PATENT DOCUMENTS

| | | | |
|---|---|---|---|
| 1,564,089 | 12/1925 | Maxwell | 124/23.1 X |
| 2,344,799 | 3/1944 | Brown et al. | 124/88 X |
| 3,926,393 | 12/1975 | Tainsh | 248/165 |
| 3,991,780 | 11/1976 | Maroski, Jr. | 248/122 X |
| 4,360,179 | 11/1982 | Roberts | 124/23.1 X |
| 4,846,140 | 7/1989 | DiMartino | 124/86 X |
| 4,993,397 | 2/1991 | Cryar et al. | 124/23.1 |
| 4,993,398 | 2/1991 | Wallace | 124/23.1 |
| 5,106,044 | 4/1992 | Regard, III et al. | 124/23.1 X |
| 5,111,800 | 5/1992 | Reynolds | 248/122 X |

Primary Examiner—Ramon O. Ramirez
Attorney, Agent, or Firm—Leon Gilden

[57] ABSTRACT

An apparatus having a support tube longitudinally and adjustably mounting an extension tube therefrom, wherein the extension tube includes an upper threaded bore receiving an externally threaded support rod for radial spaced adjustment of a U-shaped frame relative to the extension tube, wherein the U-shaped frame includes upper and lower legs, each having a respective support plate having resilient forward surface to provide for a non-marring securement of a bow utilizing a strap relative to each support plate. Support legs are provided at a lower end of the support tube or alternatively, a support base plate having locking pins directed therethrough is arranged for providing stable mounting of a support tube.

8 Claims, 4 Drawing Sheets

BOW SUPPORT APPARATUS

BACKGROUND OF THE INVENTION

1. Field of the Invention

The field of invention relates to archery apparatus, and more particularly pertains to a new and improved bow support apparatus wherein the same is directed to the mounting of an archery bow for stabilizing the archery bow during alignment and positioning of the archery bow relative to a sighting procedure to enhance accuracy by an individual.

2. Description of the Prior Art

Archery support structure of various types have been utilized throughout the prior art for various procedures such as in U.S. Pat. No. 4,846,140 to Dimartino having a stand for positioning an archery bow thereon for positioning the stand for a target sighting procedure.

U.S. Pat. No. 3,926,393 to Tainsh sets forth a collapsible bow and stand structure for supporting archery implements in the field.

U.S. Pat. No. 4,993,398 to Wallace sets forth a support stand for an archery bow member.

U.S. Pat. No. 4,360,179 to Roberts sets forth an archery bow stand to position a bow for supporting the bow upon various platforms such as tree platforms, ground platforms, and the like.

As such, it may be appreciated that there continues to be a need for a new and improved bow support apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of bow support apparatus now present in the prior art, the present invention provides a bow support apparatus wherein the same is arranged for the positioning of an archery bow during an archery sighting procedure. As such, the general purpose of the present invention, which will be described subsequently in greater detail, is to provide a new and improved bow support apparatus which has all the advantages of the prior art bow support apparatus and none of the disadvantages.

To attain this, the present invention provides an apparatus having a support tube longitudinally and adjustably mounting an extension tube therefrom, wherein the extension tube includes an upper threaded bore receiving an externally threaded support rod for radial spaced adjustment of a U-shaped frame relative to the extension tube, wherein the U-shaped frame includes upper and lower legs, each having a respective support plate having resilient forward surface to provided for a non-marring securement of a bow utilizing a strap relative to each support plate. Support legs are provided at a lower end of the support tube or alternatively, a support base plate having lock pins directed therethrough is arranged for providing stable mounting of a support tube.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved bow support apparatus which has all the advantages of the prior art bow support apparatus and none of the disadvantages.

It is another object of the present invention to provide a new and improved bow support apparatus which may be easily and efficiently manufactured and marketed.

It is a further object of the present invention to provide a new and improved bow support apparatus which is of a durable and reliable construction.

An even further object of the present invention is to provide a new and improved bow support apparatus which is susceptible of a low cost of manufacture with regard to both materials and labor, and which accordingly is then susceptible of low prices of sale to the consuming public, thereby making such bow support apparatus economically available to the buying public.

Still yet another object of the present invention is to provide a new and improved bow support apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
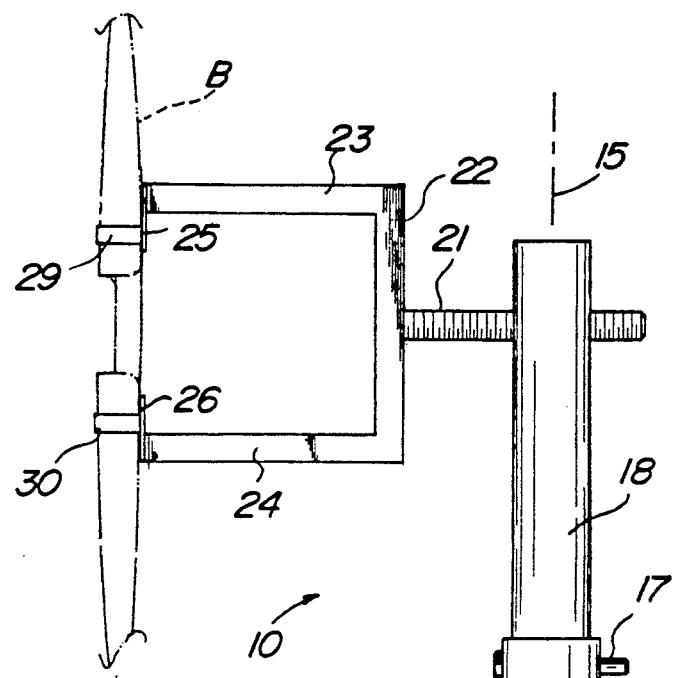
FIG. 1 is an orthographic view of the instant invention.

With reference now to the drawings, and in particular to FIGS. 1 to 7 thereof, a new and improved bow support apparatus embodying the principles and concepts of the present invention and generally designated by the reference numeral 10 will be described.

Figure 2:
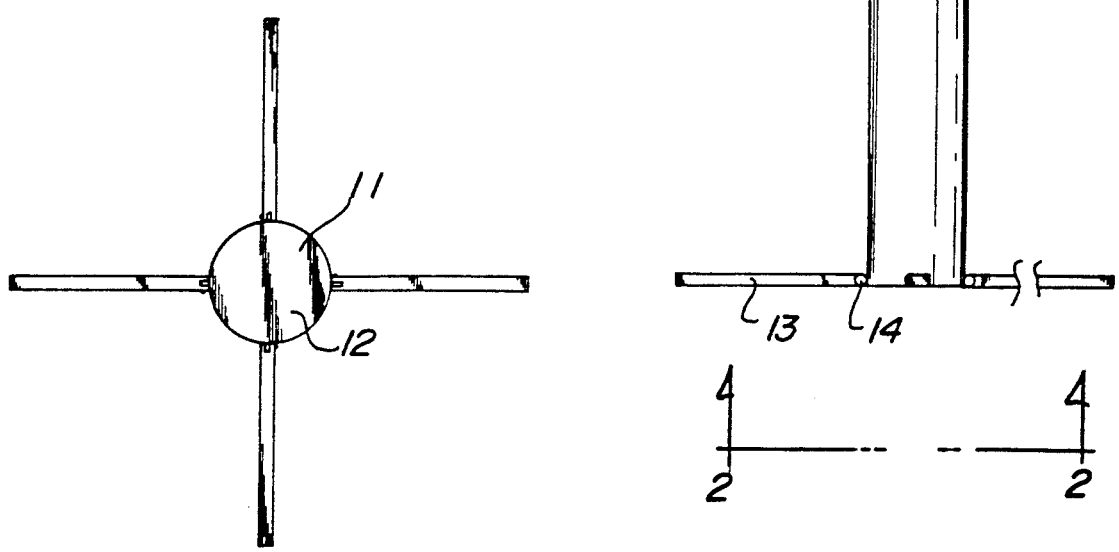
FIG. 2 is an orthographic view, taken along the lines 2—2 of FIG. 1 in the direction indicated by the arrows.
Figure 3:
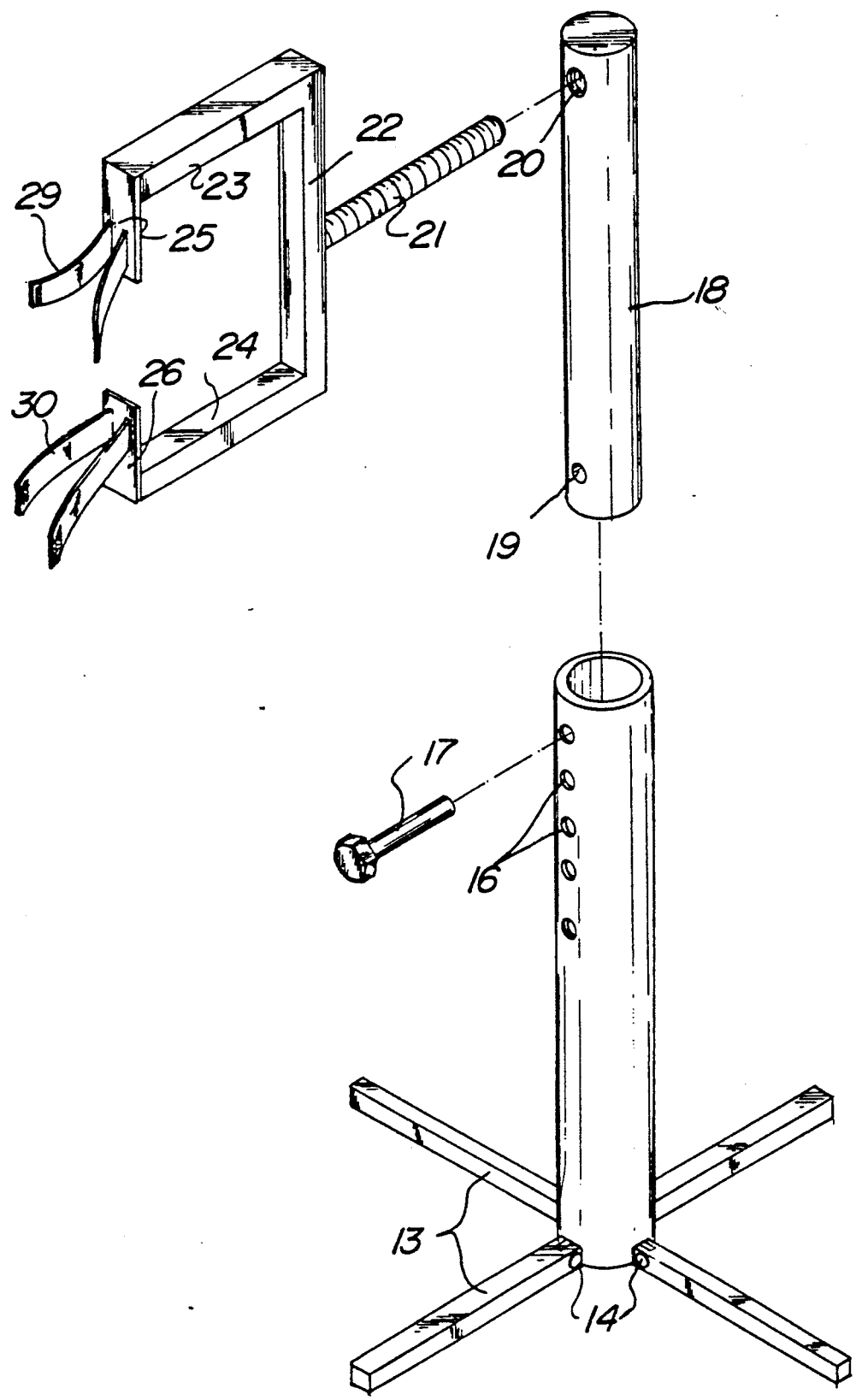
FIG. 3 is an isometric illustration of the invention in an exploded view.

More specifically, the bow support apparatus 10 of the instant invention essentially comprises a support tube 11 having a bottom wall 12, wherein as illustrated in the FIGS. 1 and 2 includes a plurality of support tube legs mounted adjacent the bottom wall 12 orthogonally oriented relative to an axis 15 of the support tube 11. A lock pin 14 may be arranged to selectively secure each support leg 13 relative to the support tube.

A longitudinal row of height adjustment bores 16 is orthogonally oriented relative to the axis 15 in a parallel relationship relative to the axis 15. A lock pin 17 is arranged for projection through one of the bores 16, wherein it is understood that the bore 16 includes a complementarily bore, such as illustrated in FIG. 1, to receive the lock pin 17 in a through-extending relationship relative to the support tube 11.

Extension tube 18 is mounted within the support tube 11 coaxially aligned with the axis 15, with the extension tube 18 having an extension tube bore 19 adjacent a lower distal end of the extension tube 18 orthogonally oriented relative to the axis 15 to receive the lock pin 17 therethrough and position the extension tube 18 within the support tube 11. An internally threaded bore 20 is directed through the extension tube 18 adjacent its upper distal end orthogonally oriented relative to the axis 15 arranged for threadedly receiving an externally threaded support rod 21. The externally threaded support rod 21 mounts a U-shaped framework at its forward distal end formed of a base plate 22 medially and integrally intersected by the support rod 21 in an orthogonal relationship. The base plate 22 includes a first arm 23 and a second arm 24 mounted at upper lower distal ends of the base plate 22 in a parallel and coextensive relationship relative to one another. A first mounting plate 25 is mounted to a forward distal end of the first arm 23, with a second mounting plate 26 mounted to a forward distal end of the second arm 24, with the first and second mounting plates 25 and 26 arranged in a coplanar relationship relative to one another having respective first and second resilient forward walls and, whereupon when a bow "B" is mounted to the forward walls and, abrasion of the bow is avoided. Further, when the bow is thusly positioned as illustrated in FIG. 1, spacing of the first and second arms 23 and 24 permits positioning of an arrow therebetween in association with a bow "B" in an archery sighting procedure.

A first strap 29 and a second strap 30 are respectively secured to the respective first and second mounting plates 25 and 26 for clamping the bow "B" relative to the first and second mounting plates 25 and 26.

Figure 4:
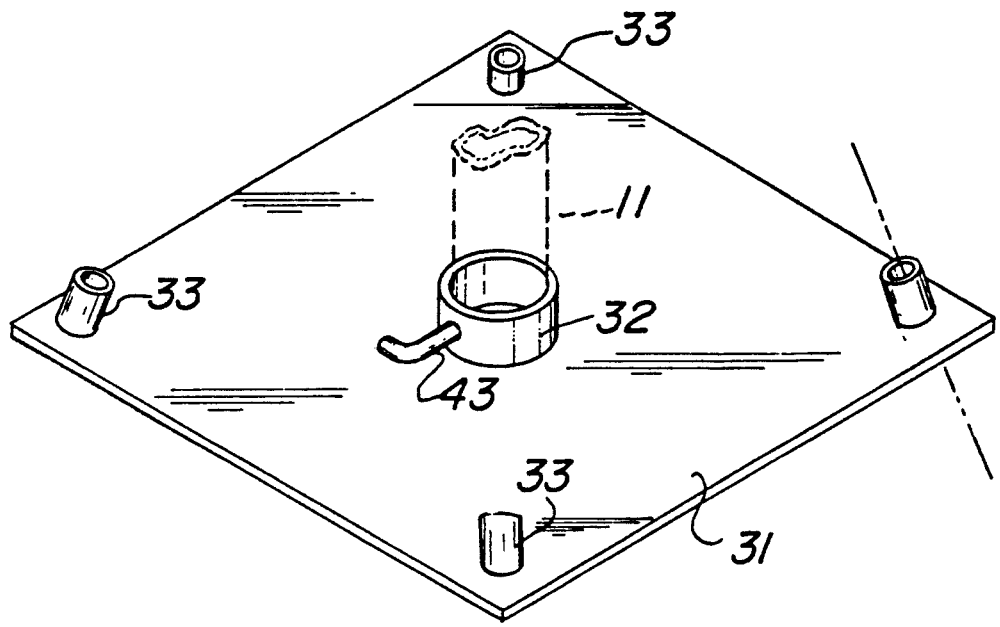
FIG. 4 is an isometric illustration of a support base plate utilized by the invention.
Figure 5:
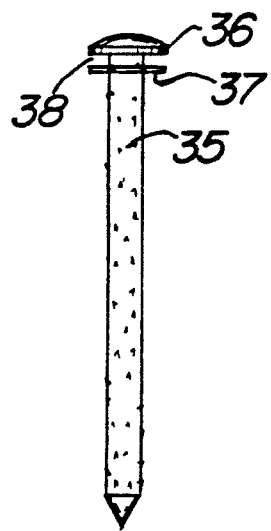
FIG. 5 is an orthographic view of a mounting spike utilized by the invention.
Figure 6:
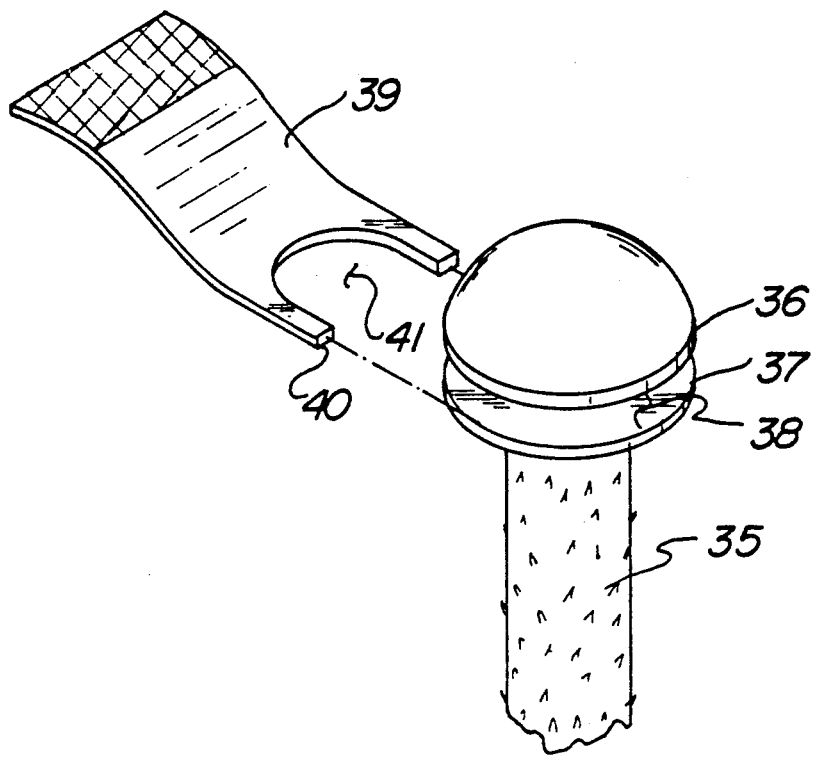
FIG. 6 is an isometric illustration of the mounting spike in cooperation with a removal tool.
Figure 7:
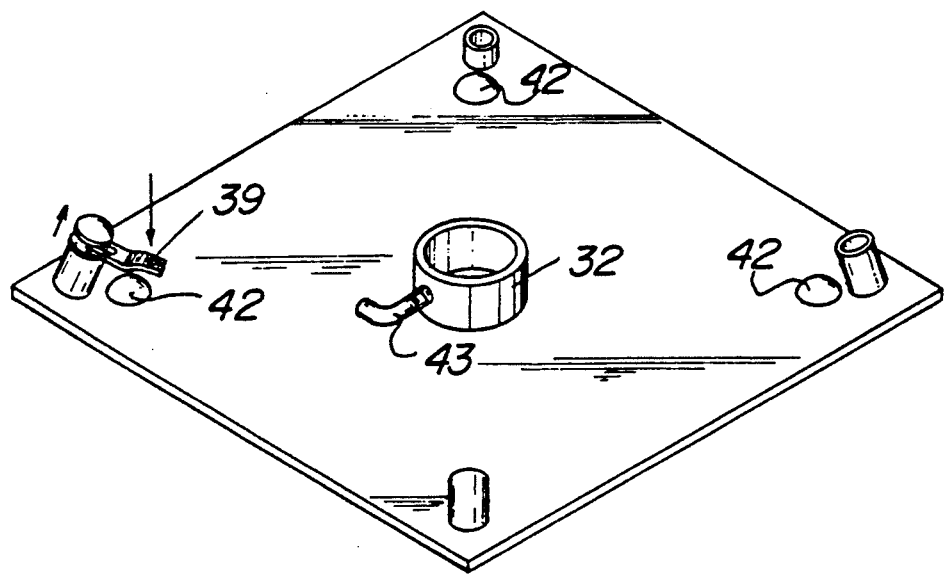
FIG. 7 is an isometric illustration of the support base plate in cooperation with the mounting spike structure.

FIG. 4 illustrates the use of a support base flange 31 having a support cylindrical sleeve 32 orthogonally positioned medially of a top surface of the support flange 31. A threaded lock screw 43 is radially directed into the cylindrical sleeve 32 to secure the support tube 11 when positioned within the sleeve, as indicated in FIG. 4.

A plurality of mounting tubes 23 are fixedly mounted at an inclined angle relative to the top surface of the support flange 31 adjacent a periphery of the support flange. An acute angle is specifically defined between each mounting tube 33 and the top surface of the support flange 31, with the mounting tubes canted towards the cylindrical sleeve 32. A lock pin 35 is arranged for projection through each mounting tube 33, with the lock pin having an outer cylindrical surface formed with a matrix of projections extending from the surface for securement to an underlying support. A lock pin first head flange 36 is mounted to an upper distal end of the lock pin in an orthogonal relationship spaced from a lock pin second head flange 37 defining a torroidal gap 38 between the first and second head flanges 36 and 37. A serpentine lift tool 39 having a first end 40 formed with a first end slot 41 is arranged to project the first end slot 41 into the torroidal gap 38. The serpentine configuration of the lift tool 39 is oriented upon downwardly depressing the lift tool 39, lifting of the lock pin relative to each associated mounting tube 33 is effected. To avoid deformation of the lock pin 35 upon its removal from the associated mounting tube 33, an abutment knob 42 is positioned between each mounting tube 33 and the cylindrical sleeve 32 in adjacency relative to the mounting tube 33.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A bow support apparatus, comprising,
    a support tube, the support tube having a support tube lower distal end and a support tube upper distal end, and
    the support tube defined about a predetermined axis, and
    a longitudinal row of height adjuster bores directed through the support tube orthogonally oriented relative to the axis, with the row arranged parallel relative to the axis, and an extension tube received within the support tube upper distal end having an extension tube bore, and the extension tube bore aligned with one of said height adjuster bores, and a lock pin directed through said one of said height adjuster bores and the extension tube bore, and the extension tube having an extension tube lower distal end and the extension tube bore directed through the extension tube adjacent the extension tube lower distal end, and the extension tube further formed with an extension tube upper distal end, and an extension tube upper internally threaded bore directed through the extension tube adjacent the extension tube upper distal end, with the extension tube coaxially aligned relative to the axis and the upper bore orthogonally oriented relative to the axis, and an externally threaded support rod threadedly received within the extension tube upper bore, the support rod including a U-shaped frame mounted to the support rod, the U-shaped frame arranged for securement of the bow to the U-shaped frame.

2. An apparatus as set forth in claim 1 wherein the U-shaped frame includes a base plate, with the support rod having a forward distal end spaced from the extension tube, with the support rod forward distal end orthogonally intersecting the base plate and integrally secured to the base plate, the base plate having a base plate upper distal end and a base plate lower distal end, the base plate upper distal end including a first arm integrally and orthogonally secured to the base plate, the base plate lower distal end including a second arm orthogonally and integrally mounted relative to the base plate lower distal end, with the first arm and the second arm arranged in a parallel coextensive relationship, a first mounting plate orthogonally mounted to the first arm projecting towards the second arm parallel to the base plate, and the second arm including a second mounting plate projecting towards the first arm in a parallel relationship relative to the base plate, wherein the first mounting plate includes a first mounting plate resilient forward wall, the second mounting plate includes a second mounting plate resilient forward wall, with a first strap directed through the first mounting plate and a second strap mounted through the second mounting plate, with the first strap and second strap arranged for securement about the bow.

3. An apparatus as set forth in claim 2 including a base flange, the base flange including a cylindrical sleeve medially and orthogonally mounted of the support flange for reception of the support tube lower distal end.

4. An apparatus as set forth in claim 3 wherein an externally threaded lock screw is directed through the cylindrical sleeve into engagement with the support tube.

5. An apparatus as set forth in claim 4 wherein the support flange includes a plurality of mounting tubes fixedly mounted to the support flange adjacent a periphery of the support flange, and each mounting tube defines an acute included angle between each respective mounting tube and a top surface of the support flange, and each mounting tube is canted towards the cylindrical sleeve, and each mounting tube is arranged for receiving a lock pin therethrough, with the lock pin directed through the mounting tube and the support flange for support to an underlying surface.

6. An apparatus as set forth in claim 5 wherein each lock pin includes a cylindrical lock pin outer wall, and the cylindrical lock pin outer wall includes a matrix of projections projecting from the cylindrical outer wall, and the lock pin includes a lock pin upper distal end, and each lock pin upper distal end includes a first head flange orthogonally oriented relative to the lock pin, and a second head flange positioned below the first head flange defining a torroidal gap therebetween.

7. An apparatus as set forth in claim 6 further including a serpentine lift tool arranged for projection and reception within the torroidal gap, wherein the lift tool is of a serpentine configuration and the lift tool including a lift tool first end, the lift tool first end including a first end slot directed into the lift tool from the first end, with the lift tool slot receiving the lock pin therewithin within the torroidal gap.

8. An apparatus as set forth in claim 7 including an abutment knob adjacent each mounting tube, with each abutment knob positioned between a respective mounting tube and the cylindrical sleeve in adjacency relative to the mounting tube to limit displacement of the lift tool when depressed for extracting the lock pin.

* * * * *